United States Patent

Schapler

[15] 3,662,715
[45] May 16, 1972

[54] ANTI-POLLUTION CATTLE FEEDING STATIONS

[72] Inventor: Fred L. Schapler, 1313 Mitchell Blvd., Mitchell, S. Dak. 57301

[22] Filed: June 24, 1970

[21] Appl. No.: 49,351

[52] U.S. Cl.............................................119/28, 210/170
[51] Int. Cl. .......................................................A01j 1/00
[58] Field of Search ......................61/10, 11; 119/1, 20, 28; 210/165, 170

[56] References Cited

UNITED STATES PATENTS

| | | |
|---|---|---|
| 1,665,104 | 4/1928 | Martienssen................................61/10 |
| 3,119,373 | 1/1964 | Schmid....................................119/28 |
| 546,478 | 9/1895 | Steinle....................................119/28 |
| 332,610 | 12/1885 | James....................................210/170 |
| 3,425,555 | 2/1969 | Ridgeway...........................210/170 X |

Primary Examiner—Samih N. Zaharna
Attorney—Hurvitz & Rose

[57] ABSTRACT

Animal feeding stations comprising a layer of perforated sheet steel, underlaid by a layer of particulate material such as sand and gravel, which is in turn underlain by a base lamina of asphalt. Collection pipes are located in the porous material, which are arranged to lead liquid waste produced by the animals to a sump.

5 Claims, 7 Drawing Figures

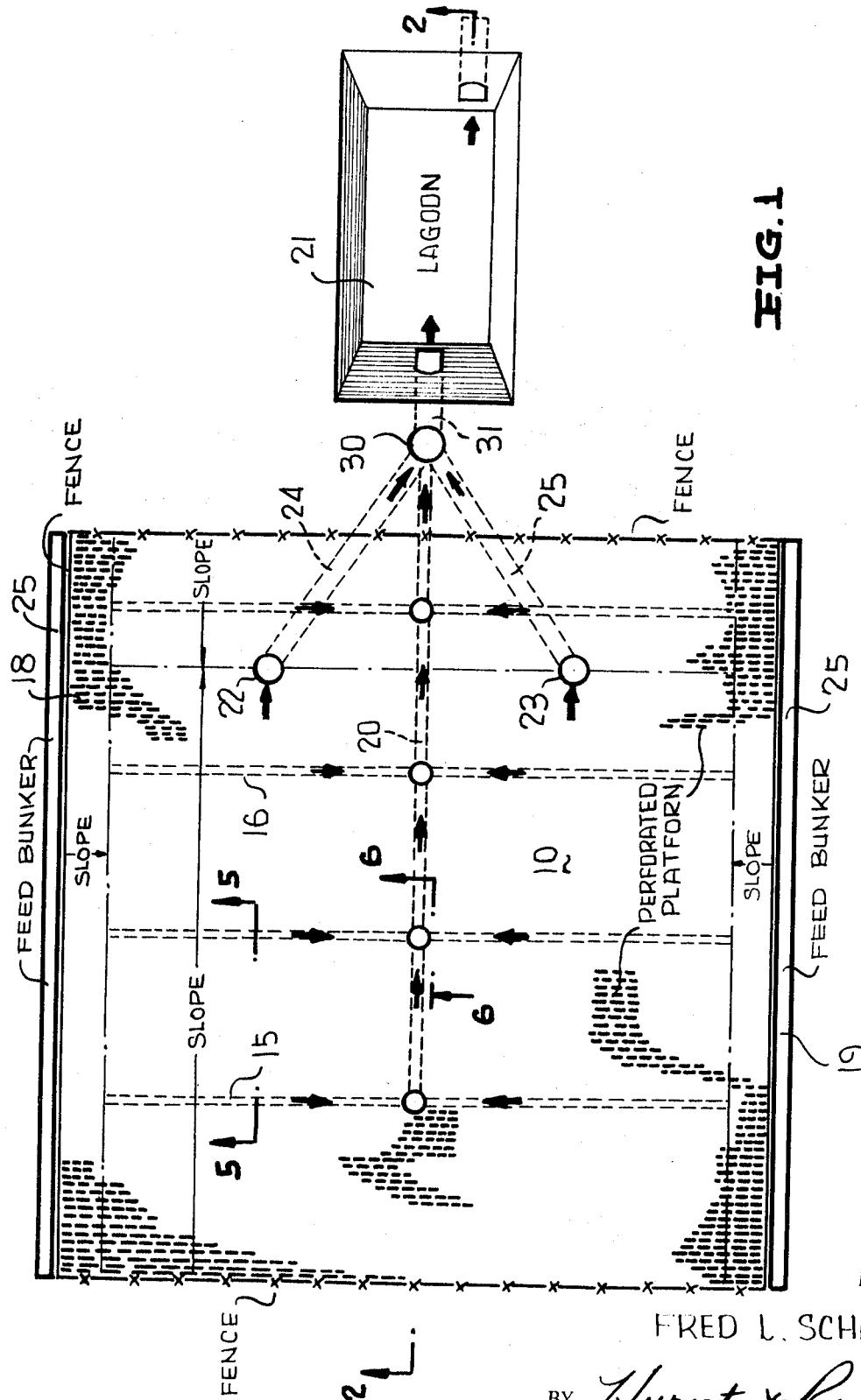

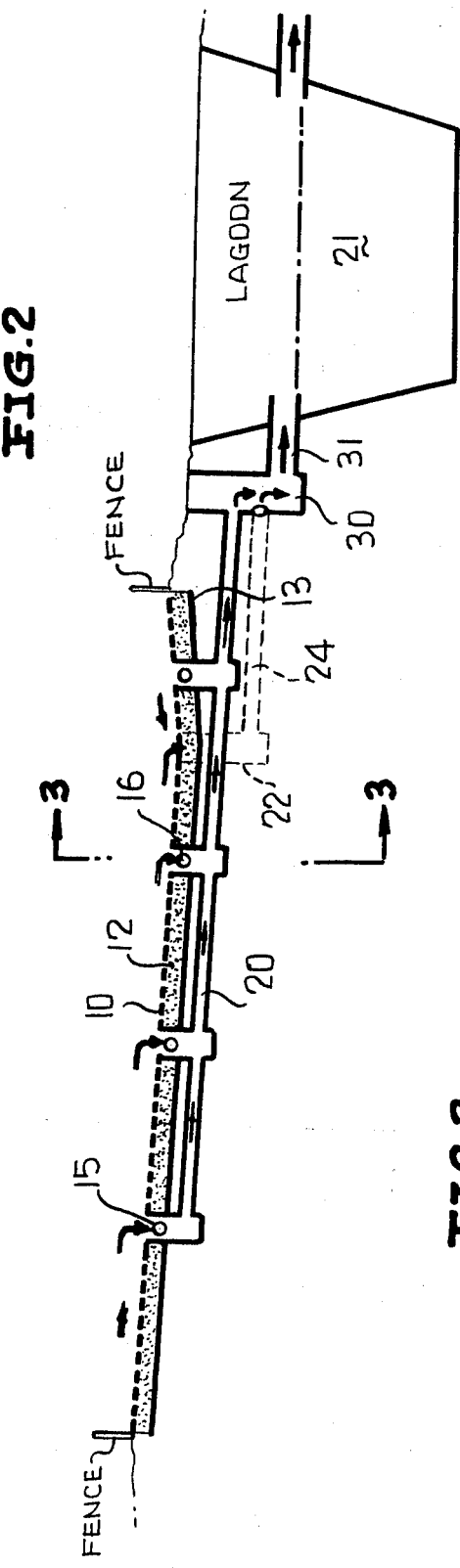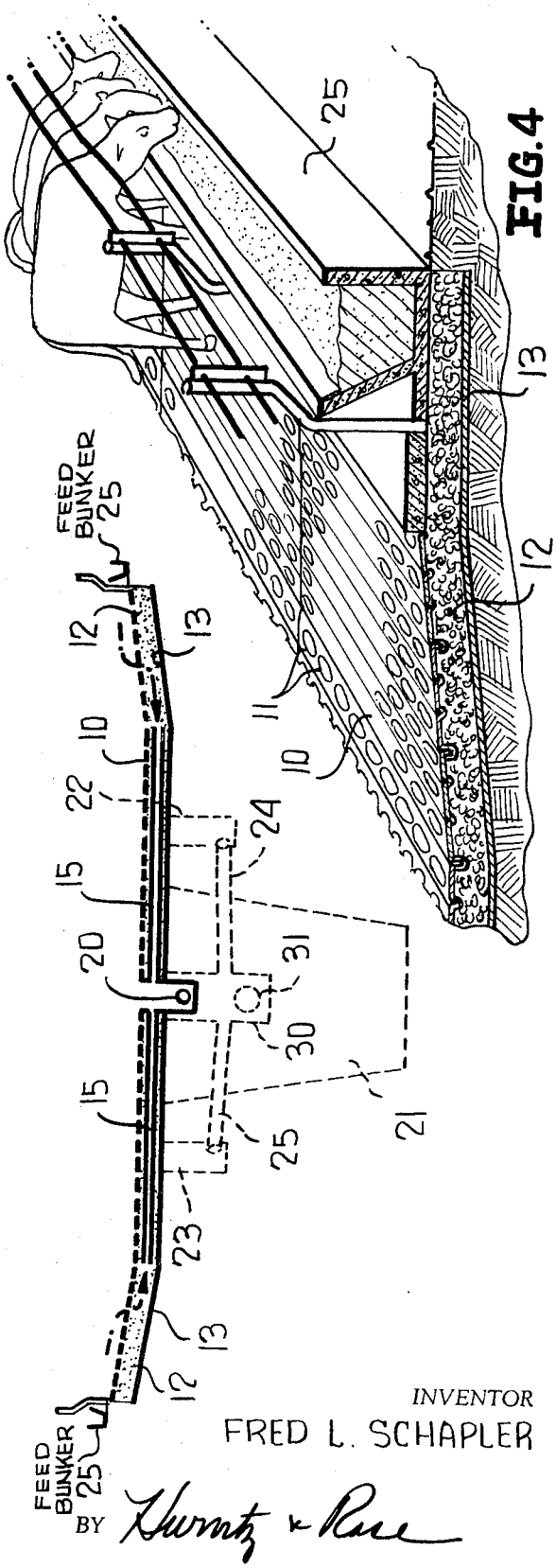

INVENTOR
FRED L. SCHAPLER

ATTORNEYS

ANTI-POLLUTION CATTLE FEEDING STATIONS

BACKGROUND OF THE INVENTION

Animal feeding stations are generally located adjacent to water. The waste material produced by the animals pollutes the water, by run off. This waste also pollutes the area in which the animals feed, which has a deleterious effect on the health of the animals.

In the case of cattle 80 percent of their nominally solid waste is in fact water and the remainder is straw-like and is readily removed when dry. It follows that systems for removing liquid from feeding areas for cattle, which act promptly, are highly desirable. Various devices have been provided for this purpose, including forms of special paving of the feeding area. It is necessary to employ a surface which is safe for the animals to walk on, which removes liquid where it is produced rather than by above-ground run-off, since a feeding area may cover several acres, which provides for removal, for the purpose of sale or disposal, of the liquid and which enhances the comfort and health of the animals, and which is economical to fabricate.

In certain areas of the country considerable rain and snow may fall. It is desirable that the system installed to remove waste liquid also facilitate snow removal and rain removal.

It is an advantage of the present system that it uses a minimum of steel in thin sheet form, and requires little and unskilled labor to lay the sheet, so that total finished cost per acre is small. It is further an advantage that disposal of liquid is instantaneous via perforations in the sheet but that these perforations are, because they exist in thin sheet, filled with sand and/or gravel, so that animals cannot catch their feet in the perforations. The perforated area of the sheets constitutes a large part of the total area of the sheets, to provide a large area for liquid absorption and to decrease weight of steel and thus costs.

There has been an increasing trend toward providing a clean environment for farm animals. Improvement of the environment can reduce the cost of production about 30 percent, because weight increases are accomplished for less feed, because disease is reduced, and because the animals have more attractive appearances and thereby bring higher prices.

Slotted floors have heretofore been used to provide underspace into which waste matter can fall. These floors have been commonly made of steel, because metal is durable, self-cleaning, and remains sanitary in use. However, such floors merely provide an underspace which collects waste and which must be cleaned. Danger exists that animals will damage their feet in apertures provided to drain liquids. And cost of a raised floor is considerable because the floor must be capable of supporting great weight, so that the concept is uneconomical for feeding stations which may extend over several acres.

It is necessary to provide some resilience, such as occurs on natural range, under the animals feet, and to provide insulation of the animals from their own waste and to provide an effective drainage system capable of collecting liquid waste into one or a few sumps, from which it can be removed for use or sale, all of which is accomplished by the present system, but not by other systems known to me.

SUMMARY OF THE INVENTION

An animal feeding station providing a highly perforated metallic layer, over a supporting layer of particulate material, in turn laid over a base lamina of asphalt, and provided with perforated pipes for running off liquid from the particulate material to a sump.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a plan view of a system according to the invention;

FIG. 2 is a view in transverse section, showing a waste collection system, according to the invention, and taken on line 2—2 of FIG. 1;

FIG. 3 is a view in transverse section taken on the line 3—3 of FIG. 2;

FIG. 4 is a view in perspective of a cattle feeding station, according to the invention;

DESCRIPTION OF THE PREFERRED EMBODIMENT

Figure 5:
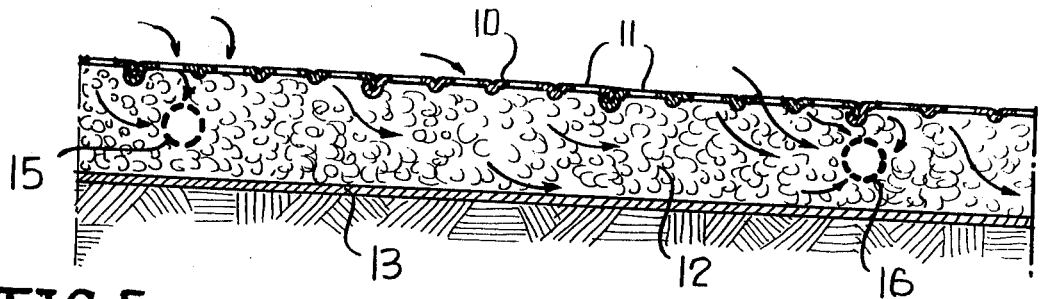
FIG. 5 is a view in section taken on the line 5—5 of FIG. 1.

In FIG. 1, 10 is a perforated steel sheet platform, essentially flat and containing a very large number of relatively large circular openings 11 (FIG. 4). The precise form of the platform, and of the metal employed, can be a matter of choice, but flat perforated sheets are inexpensive and reasonably light weight, and have been made in sheets which interlock without requiring skilled artisans or special tools to accomplish the laying and interlocking, and have been widely used in preparing air strips by the U.S. Air Force. Costs of procurement and installation of such sheets can be kept low.

To provide an adequate supporting base for the sheet, one which will protect the feet of the cattle, the sheet 10 is underlain with a layer 12 of sand and/or gravel, sometimes called aggregate. The latter fills the holes 11 in the sheet, so that the animals have firm footing, which further provides some resilience and feel-of-ground for the cattle.

Under the layer 12 of aggregate, which may be about one foot in thickness, is laid a base layer or lamina of asphalt, 13. The effect is to trap all liquid material in the aggregate between the sheet 10 and the asphalt layer 13. The sheet may be laid with a net slope, to prevent formation of puddles and to encourage run-off.

Laid in the aggregate are perforated collection pipes 15, 16. Typically, subsidiary collection pipes may extend from near the edges 18, 19 of a station towards a central collection pipe 20, the former being sloped appropriately, and the latter as well, so that the liquid ultimated flows to a larger lagoon 21. In addition the platform 10 may slope from all directions to surface inlets 22, 23, in the form of graded covers, which also communicate via pipes 24, 25 with lagoon 21. The latter are of particularly utility in case of rain, or melting of large quantities of snow, which can run off and need not seep through the aggregate.

In FIG. 1, 25 may represent feed bunkers, shown in perspective in FIG. 4, which are in themselves conventional.

Figure 6:
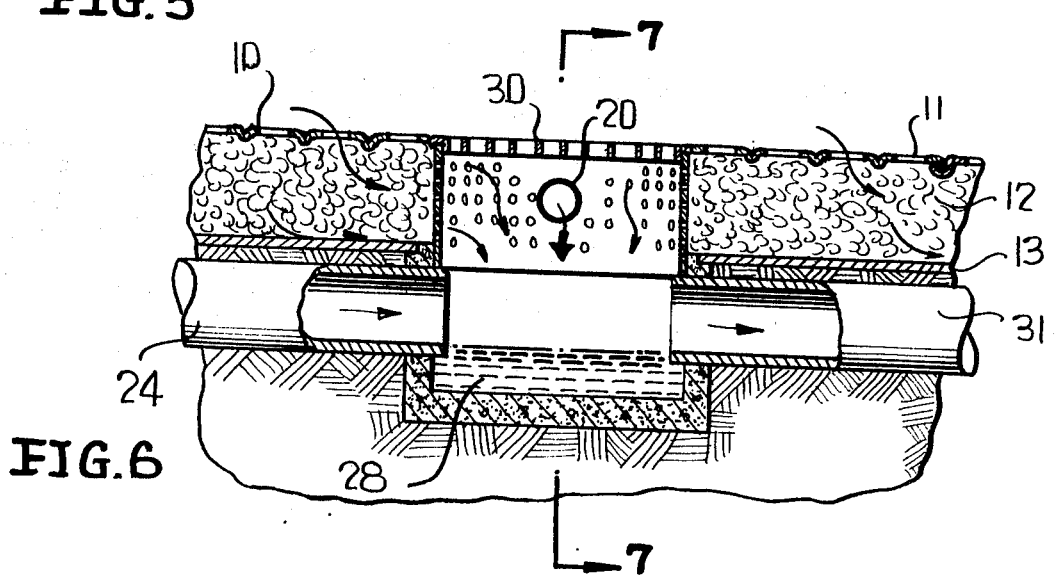
FIG. 6 is a view in section taken on the line 6—6 of FIG. 1.
Figure 7:
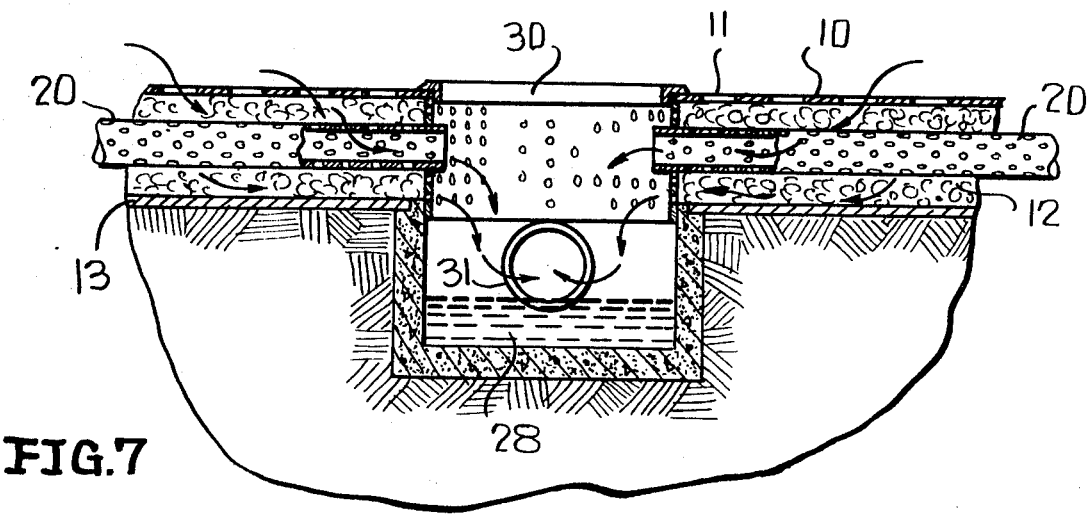
FIG. 7 is a view in section taken on the line 7—7 of FIG. 6.

FIG. 6 illustrates a graded manhole cover, as 30, which communicates directly with a small sewer 28, and into which and from which extend pipes 24, 31, respectively, the latter proceeding to the lagoon 21.

It may be noted that openings 11 comprise perhaps one-third of the total area of the platform. This can readily be increased to one-half or more. The asphalt layer itself slopes, so that liquid will arrive at one of the sewers provided, for transfer to the lagoon, by direct flow along the surface of the asphalt. The collection pipes 15, 16 can be positioned within the aggregate well above the asphalt, as illustrated in FIG. 5, but they may also be laid along the surface of the asphalt. In either case when the level of the liquid reaches the openings in the pipe flow-off is accelerated, i.e. it is slow along the asphalt, and in the nature of seepage, but quite rapid via pipes. Therefore, a layer built up of liquid level in the aggregate is not possible.

The present system can be built wholly above ground, i.e. asphalt can be laid on a surface, provided with the required drainage slope either naturally present or formed by bulldozing. Pipes can be then installed, and aggregate poured in the form of sand and/or gravel, surfaced to provide the required slopes or grades, and thereafter the sand and/or gravel can be overlaid with interlocked perforated steel sheets, which will inherently then have the requisite slopes or grades.

While I have referred to a layer of asphalt, in fact any liquid impervious base lamina may be employed. The sand and/or gravel are preferred forms of particulate material, but in some areas of the country sandy soil may be readily available and can be employed as particulate matter. It is important to note that there will be times when heavy rains or melting snow will overload the particulate matter. This difficulty is overcome by suitably sloping the plate and strategically locating a few grate covered manholes, which communicate rather directly with the main lagoon. The base lamina must itself slope to collection ports, so that for small quantities of liquid its surface will provide the main run-off facility. The perforated pipes take over if the base lamina cannot handle the load, and direct flow over the plate occurs if the pipes and particulate matter become overloaded. At the same time any animal material which falls on the plate, must fall at or near a port thereof, and is promptly run off into the particulate matter, so that the plate supports no pools of liquid, but at most a film, which soon evaporates.

This system is not intended to dispose of solid waste. In the case of cattle this amounts to 20 percent of the total, but the residue of solid material is straw-like and can be removed readily.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An animal feeding station, comprising a fence enclosing an area, at least one feed station adjoining said fence, a layer of asphalt co-extensive with said area, a layer of particulate material overlying said layer of asphalt over substantially its entire layer, a layer of perforated thin sheet steel lying flat on said layer of particulate material, a sump, and pipe means for conveying liquid produced by said animals from said particulate material to said sump, said pipe means being located below said layer of perforate thin sheet steel but above said layer of asphalt.

2. The combination according to claim 1, wherein said particulate material is primarily gravel.

3. The combination according to claim 1, wherein said last means includes perforated pipes laid above said layer of asphalt, said pipes communicating with all areas of said station and being sloped sufficiently to provide rapid drainage from said particulate material to said sump for all areas of said station.

4. A feeding station for animals, comprising a fence defining the boundaries of said feeding station, at least one feed bunker adjoining said fence, a layer of perforated steel sheet material substantially covering the entire area within said fence, a quantity of particulate non-absorbent solid material underlying and supporting all said sheet material, and means for collecting liquid deposited on said layer of perforated steel sheet material from said particulate solid material.

5. An animal station, comprising a fence enclosing said station, at least one feed bunker adjoining said fence, a base lamina underlying the area defined by said fence and a layer of non-liquid-absorbent particulate matter supported by said base lamina, a layer of perforated thin sheet steel plate supported on said particulate matter and extending over the area defined by said fence, the perforations of said plate encompassing at least 25 percent of the area of said plate, a lagoon, and perforated collection pipes distributed within said particulate matter, wherein said base lamina, pipes and plate are all sloped to facilitate gravity flow of liquid to said lagoon, cisterns communicating directly with said lagoon, pipe means interconnecting said cisterns with said lagoon, and means providing direct access from said particulate matter to said lagoon, whereby plural modes of run-off of liquid matter can occur from the upper surface of said plate to said lagoon, viz. directly over the surface of said plate, directly through said aggregate, and through said perforated pipes.

* * * * *